(12) United States Patent
Reiners

(10) Patent No.: US 9,099,708 B2
(45) Date of Patent: Aug. 4, 2015

(54) OPERATING PROCESS FOR A FUEL CELL SYSTEM

(75) Inventor: Karsten Reiners, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 127 days.

(21) Appl. No.: 13/152,397

(22) Filed: Jun. 3, 2011

(65) Prior Publication Data
US 2011/0311893 A1 Dec. 22, 2011

(30) Foreign Application Priority Data

Jun. 10, 2010 (DE) .......................... 10 2010 023 392

(51) Int. Cl.
*H01M 8/06* (2006.01)
*H01M 8/04* (2006.01)

(52) U.S. Cl.
CPC ........ *H01M 8/0612* (2013.01); *H01M 8/04223* (2013.01); *H01M 8/0618* (2013.01); *Y02E 60/50* (2013.01)

(58) Field of Classification Search
CPC .......... H01M 8/0612; H01M 8/04223; H01M 8/0618; Y02E 60/50
USPC ............... 429/8, 22, 400, 408, 416, 423, 427, 429/428, 429, 433
See application file for complete search history.

(56) References Cited

U.S. PATENT DOCUMENTS

| | | | |
|---|---|---|---|
| 5,019,463 A * | 5/1991 | Matsubara et al. | 429/423 |
| 5,942,346 A * | 8/1999 | Ahmed et al. | 429/416 |
| 6,383,468 B1 | 5/2002 | Schuessler et al. | |
| 6,793,693 B1 * | 9/2004 | Koehne et al. | 44/300 |
| 6,926,748 B2 | 8/2005 | Goebel et al. | |
| 7,037,349 B2 | 5/2006 | Dauer et al. | |
| 2002/0025458 A1 * | 2/2002 | Faville et al. | 429/13 |
| 2002/0146604 A1 * | 10/2002 | Matoba | 429/20 |
| 2003/0000145 A1 * | 1/2003 | Salemi et al. | 48/199 FM |
| 2003/0054215 A1 * | 3/2003 | Doshi et al. | 429/26 |

(Continued)

FOREIGN PATENT DOCUMENTS

| | | |
|---|---|---|
| DE | 101 53 179 A1 | 5/2003 |
| DE | 102 52 075 A1 | 6/2003 |

(Continued)

OTHER PUBLICATIONS

Hartman (Second European Conference on Small Burner and Heating Technology ECSBT 2 vol. II pp. 411-418 Stuttgart Mar. 16-17, 2000).*

*Primary Examiner* — Patrick Ryan
*Assistant Examiner* — Aaron Greso
(74) *Attorney, Agent, or Firm* — McGlew and Tuttle, P.C.

(57) ABSTRACT

A fuel cell system with a reformer for generating hydrogen-containing synthesis gas and a fuel cell of the fuel cell system. The fuel cell is arranged downstream of the reformer. The fuel cell system is heated up conventionally in a first heat-up phase by combusting a superstoichiometric fuel/air mixture. The first heat-up phase is stopped by stopping the combustion of the fuel/air mixture in the mixing chamber of the reformer. In a second heat-up phase, in which the reformer catalyst is operated in the catalytic combustion operation with a superstoichiometric fuel/air mixture, the entire heat-up process can be significantly shortened by a change in stoichiometry at the end of the second heat-up phase.

20 Claims, 2 Drawing Sheets

(56) References Cited

U.S. PATENT DOCUMENTS

| | | |
|---|---|---|
| 2003/0093949 A1 | 5/2003 | Goebel et al. |
| 2003/0233789 A1* | 12/2003 | Dauer et al. ............... 48/197 R |
| 2004/0001983 A1* | 1/2004 | Matos da Silva et al. ...... 429/17 |
| 2004/0062956 A1 | 4/2004 | Goebel et al. |
| 2005/0069741 A1* | 3/2005 | Enokizu et al. ................. 429/26 |
| 2005/0130085 A1 | 6/2005 | Kamijo .............................. 431/6 |
| 2005/0186455 A1* | 8/2005 | Kaye et al. ...................... 429/17 |
| 2005/0198900 A1 | 9/2005 | Nashburn et al. |
| 2005/0227129 A1 | 10/2005 | Iio |
| 2006/0292410 A1* | 12/2006 | Kaupert et al. ................. 429/20 |
| 2007/0287038 A1* | 12/2007 | Lindstrom et al. .............. 429/17 |
| 2008/0187797 A1* | 8/2008 | Edlund ........................... 429/17 |
| 2009/0197131 A1* | 8/2009 | Sugiura .......................... 429/20 |

FOREIGN PATENT DOCUMENTS

| | | |
|---|---|---|
| DE | 103 43 811 B4 | 4/2004 |
| DE | 103 43 811 B4 | 4/2007 |
| DE | 602 22 962 T2 | 2/2008 |
| EP | 1 040 079 B1 | 6/2001 |
| EP | 1 375 420 B1 | 2/2004 |
| EP | 13 754 420 B1 | 9/2008 |
| WO | WO 2009/017439 * | 2/2009 ............. H01M 8/04 |

* cited by examiner

OPERATING PROCESS FOR A FUEL CELL SYSTEM

CROSS REFERENCE TO RELATED APPLICATIONS

This application claims the benefit of priority under 35 U.S.C. §119 of German Patent Application DE 10 2010 023 392.7 filed Jun. 10, 2010, the entire contents of which are incorporated herein by reference.

FIELD OF THE INVENTION

The present invention pertains to a process for starting a fuel cell system equipped with a reformer for generating hydrogen-containing synthesis gas.

BACKGROUND OF THE INVENTION

In order for fuel cells to be able to be operated, they must be brought to a predetermined operating temperature. A fuel cell reaction takes place only incompletely or not at all below this predetermined operating temperature. Consequently, the fuel cell system must be brought to this predetermined operating temperature in a heat-up phase. This may be carried out by an electric heating or by combusting the particular fuel being used in the fuel cell system with atmospheric oxygen, using the heat of combustion thus generated to heat up the system.

SUMMARY OF THE INVENTION

The present invention pertains to the object of providing an improved or at least another embodiment for a process for starting a fuel cell system equipped with a reformer for generating hydrogen-containing synthesis gas, which embodiment is characterized especially by a short heat-up phase and rapid start of the fuel cell system with a simultaneous reduction of the tendency towards the deposition of carbon on the anode.

According to the invention, a process for starting a fuel cell system equipped with a reformer for generating hydrogen-containing synthesis gas, which said fuel cell system has at least one fuel cell arranged downstream of the reformer. The process comprises bringing a reformer catalyst to a predetermined operating temperature during a first heat-up phase in a high-temperature combustion operation by means of combustion of a fuel/air mixture in a mixing chamber of the reformer. The combustion of the fuel/air mixture in the mixing chamber is then stopped at the end of the first heat-up phase. The process further includes operating the reformer at a beginning of a second heat-up phase in a catalytic combustion operation by the catalytic combustion of a superstoichiometric fuel/air mixture in the reformer catalyst.

The present invention is based on the general idea of operating the reformer at the beginning of a second heat-up phase in a catalytic combustion operation by the catalytic combustion of a superstoichiometric fuel/air mixture in the reformer catalyst in a process for starting a fuel cell system equipped with a reformer for generating hydrogen-containing synthesis gas, which said fuel cell system has a fuel cell of the fuel cell system arranged downstream of the reformer. A reformer catalyst is brought to a predetermined operating temperature during a first heat-up phase in a high-temperature combustion operation by means of burning a fuel/air mixture in a mixing chamber of the reformer, wherein the combustion of the fuel/air mixture in the mixing chamber is stopped at the end of the first heat-up phase.

The advantage of such a two-phase heat-up phase is the higher speed with which the fuel cell system can be brought to operating temperature. The reformer catalyst is conventionally brought for this purpose by combusting the fuel/air mixture in the mixing chamber of the reformer to a temperature starting from which a catalytic combustion of the fuel/air mixture by means of the reformer catalyst becomes possible. The combustion can thus be stopped after reaching this temperature in the mixing chamber, so that a further heating of the fuel cell system based on catalytic combustion of the fuel/air mixture becomes possible in a second heat-up phase. As a result, heating up of the fuel cell system is possible, on the whole, more rapidly, so that the fuel cell system can be brought to operating temperature more rapidly and thus it can be used more rapidly.

A fuel cell system has at least one fuel cell. The fuel cell is equipped with an anode and a cathode. The respective chemical reactions, by means of which electric current can be generated, take place at the anode and cathode. Oxygen is usually converted at the cathode of the fuel cell into an oxide ion, whereas hydrogen is converted into protons at the anode of the fuel cell. Thus, water is produced from hydrogen and oxygen in the overall balance of the reactions taking place at the anode and cathode and the reaction energy being released in the process is converted at least partly into electrically usable energy. Fuel cells are also known that do not use hydrogen as the gas for the anode, but, e.g., methyl alcohol, e.g., in the methyl alcohol direct fuel cell.

It is also possible to use hydrogen directly as a fuel for the anode. However, this has the drawback that hydrogen must be carried along in the form of compressed gas with, e.g., the motor vehicle, and increased safety measures must be taken, e.g., in case of an accident, because of the explosion hazard of hydrogen gas. By contrast, the generation of hydrogen as needed from other fuels is advantageous, because only small quantities of hydrogen, which is difficult to store and to be carried along, can be generated on site depending on the need. For example, hydrocarbons containing 1 to 20 C atoms or alcohols, e.g., methyl alcohol, ethyl alcohol, propyl alcohol, isopropyl alcohol, butyl alcohol or the like are available as fuels in this case. These fuels are split by a reformer arranged upstream of the fuel cell partly into hydrogen and other products, so that at least hydrogen is available for the anode reaction. Other reformer products, e.g., short-chain alkanes containing 1 to 8 C atoms, may usually also be used for an anode reaction, and the hydrogen of these alkanes is converted essentially at least partly into protons by an anode reaction.

The anode material of the fuel cell usually has the typical anode reaction of the fuel cell beginning from a predetermined operating temperature. The anode material thus has to be brought to this predetermined operating temperature to be able to assume its typical function. It should be noted in this connection that the anode material is so sensitive to atmospheric oxygen beginning from a predetermined reox temperature that it reacts with atmospheric oxygen beginning from this predetermined reox temperature and is at least partly inactivated by a corresponding reox reaction. This must be avoided under any circumstances, because the function of the anode can be destroyed by atmospheric oxygen at least partly as a result.

If other fuels, e.g., gasoline or diesel fuel, is used for the anode rather than pure hydrogen, the fuel must be converted into synthesis gas by a reformer before it can be sent to the anode. The hydrogen of the hydrocarbon-containing fuel is converted at least partly into hydrogen essentially by a reaction of the hydrocarbon fuels with atmospheric oxygen, while the carbon component of the hydrocarbon-containing fuels reacts to form carbon monoxide and carbon dioxide. Among other things, hydrogen gas is thus generated by the reformer from the hydrocarbon-containing fuels, and this hydrogen gas can be converted into protons at the anode of the fuel cell in an anode reaction. This type of operation of a fuel cell system is preferred because hydrocarbon-containing fuels are available in sufficient quantities, they can be transported without problems and the explosive hydrogen can be produced from these as a synthesis gas in small quantities only and as needed by a reformer arranged upstream of the fuel cell.

Besides hydrogen, the carbon monoxide of the synthesis gas can also be reacted at the anode and thus utilized for energy generation in case of high-temperature fuel cells.

A reformer is built up, as a rule, from a mixing chamber and a reformer catalyst. The hydrocarbon-containing fuel is mixed with air to form an ideally homogeneous mixture in the mixing chamber, and this mixture is subsequently sent over the reformer catalyst of the reformer, where it is catalytically converted into synthesis gas.

Like the anode, the reformer also has to be heated up in order for the catalytic conversion of the hydrocarbon-containing fuel into synthesis gas to become possible. The reformer catalyst must be brought for this purpose to the reforming operation temperature. It should also be ensured that the reformer catalyst does not exceed a maximum temperature, because the reformer catalyst is overheated beginning from the maximum temperature and the catalytic capacity of the reformer catalyst is partly lost because of the overheating. It should therefore be ensured when operating the fuel cell system and when putting same into operation that the reformer catalyst remains below this predetermined maximum temperature.

Furthermore, catalytic combustion of an especially superstoichiometric fuel/air mixture by means of the reformer catalyst is possible beginning from a combustion operating temperature of the reformer catalyst. The reformer catalyst must be brought for this purpose to a combustion operating temperature or to a temperature above same. The combustion operating temperature beginning from which the reformer catalyst can catalyze the combustion of the fuel/air mixture is usually lower than the reformer operating temperature beginning from which the reformer catalyst can generate synthesis gas from the fuel/air mixture.

The formation of carbon, which occurs during the substoichiometric operation of the reformer in the synthesis gas cooling at the cold anode, and the deposition of carbon on the anode, which is associated therewith, can be avoided based on the superstoichiometric fuel/air mixture.

The reformer, comprising a mixing chamber and a reformer catalyst, can be operated in at least three different operating states. A superstoichiometric fuel/air mixture is combusted conventionally in the mixing chamber in the high-temperature combustion operation. This high-temperature combustion operation is used to heat up the fuel cell system, because both the reformer catalyst and the anode or anode space can be heated up by the heat of combustion generated.

Furthermore, the reformer may be operated in a catalytic combustion operation. The reformer catalyst must be brought for this purpose at least to the combustion operating temperature. If the reformer catalyst is at the combustion operating temperature or at a temperature above the combustion operating temperature, a superstoichiometric fuel/air mixture can be combusted catalytically by means of the reformer catalyst in the catalytic combustion operation. This catalytic combustion operation of the reformer can likewise be carried out to heat up the reformer catalyst as well as the anode space arranged downstream or the anode of the fuel cell.

The reformer is operated in the reforming operation such that a substoichiometric fuel/air mixture is converted by the reformer into synthesis gas, which can subsequently react at least into protons with respect to the hydrogen present in the synthesis gas for the anode of the fuel cell in an anode reaction.

This is preferred beginning from a surface temperature of the anode beginning from which the separation of carbon from the synthesis gas in case of contact between the synthesis gas and anode, which is harmful for the anode, is markedly reduced.

It must be ensured in all three operating states described that the maximum temperature of the reformer catalyst shall not be exceeded and that no oxygen shall come into contact with the anode or anode material after reaching the reox temperature of the anode. Furthermore, it shall likewise be ensured that the anode of the fuel cell is not overheated and it does not lose its ability to function at least partly because of the overheating.

The fuel/air mixture is formed in the mixing chamber of the reformer by air being fed into the mixing chamber, while fuel is introduced at the same time into the mixing chamber and evaporated. As a result, an ideally homogeneous fuel/air mixture is formed. If so much fuel is present in the fuel/air mixture that the oxygen of the fuel/air mixture is sufficient to completely combust the fuel at least theoretically, one speaks of a stoichiometric fuel/air mixture. If air or oxygen is present in excess, this fuel/air mixture with air excess is called superstoichiometric, whereas a fuel/air mixture with fuel excess and oxygen deficit is called substoichiometric. The air ratio is $\lambda>1$ in case of a superstoichiometric fuel/air mixture, whereas the air ratio is $\lambda<1$ in case of a substoichiometric fuel/air mixture. If a stoichiometric fuel/air mixture is present, the air ratio is $\lambda=1$.

To improve the mixing of the fuel/air mixture, a cold flame reaction can be initiated in the mixing chamber of the reformer in case of both superstoichiometric and substoichiometric fuel/air mixtures. In order for the cold flame reaction to take place, only a predetermined temperature range must be set in the mixing chamber, within which range the cold flame reaction becomes automatically established independently from other parameters, e.g., the air ratio $\lambda$, flow velocity, pressure or the like.

Based on the cold flame reaction taking place in the mixing chamber, the homogenization of the fuel/air mixture is improved and longer-chain hydrocarbon-containing fuels are advantageously converted into shorter-chain hydrocarbon-containing fuels. The formation of synthesis gas by the reformer catalyst is improved hereby, because the fuel will have already been partially decomposed before.

A cold flame reaction is defined as a phenomenon in which a fuel/air mixture has a partial oxidation of the fuel in a predetermined temperature range. The temperature range within which such a cold flame reaction becomes spontaneously established is in the range of 300-500° C. in case of, e.g., light heating oil. Such a cold flame reaction does not practically occur at lower temperatures, whereas the self-ignition of such a fuel/air mixture may occur at higher temperatures. Contrary to the high-temperature oxidation, which is colloquially called combustion, only incomplete combustion of the fuel takes place in a cold flame reaction, regardless of whether a superstoichiometric or substoichiometric fuel/air mixture is used, so that only a small portion of the oxygen available, e.g., less than 20%, is reacted. The cold flame reaction is associated with a blue lighting and is characterized by a reduction of the conversion towards higher temperatures of the temperature range. This region of the reduction of the conversion is usually called the region with negative temperature coefficient in the literature. This region with negative temperature coefficient is reduced by increasing pressure and is shifted at higher pressures towards a higher temperature, so that the temperature range for the cold flame reaction is also shifted towards higher temperatures at a higher pressure. Since the oxidation resistance of hydrocarbons decreases with increasing length of the molecule, the cold flame reaction is detectable especially in case of higher hydrocarbons and can thus be advantageously used precisely in case of these longer-chain hydrocarbons, while longer-chain hydrocarbons are decomposed into short-chain hydrocarbons.

Thus, the homogenization of the fuel/air mixture is improved, on the one hand, by the cold flame reaction taking place in the mixing chamber, and, on the other hand, the fuel/air mixture is improved with respect to the subsequent reformer reaction into synthesis gas by the decomposition of the longer-chain hydrocarbons. In addition, the cold flame reaction starts in a superstoichiometric fuel/air mixture as well as in a substoichiometric fuel/air mixture and even in a stoichiometric fuel/air mixture if the mixing chamber has a temperature that is within the cold flame temperature range.

As was already explained before, the fuel cell system must be brought to a predetermined operating temperature for the reactions taking place at the anodes and cathodes to be able to take place. The fuel cell system is usually brought for this purpose to this operating temperature by means of a heat-up phase. If the operating temperature is reached, the reformer operation is changed over to the reforming operation. In the reforming operation, the reformer produces synthesis gas from a substoichiometric fuel/air mixture, and this synthesis gas contains hydrogen, which is in turn converted into protons at the anode of the fuel cell in an anode reaction.

In order for the heating up of the fuel cell system to the operating temperature to take place more rapidly and for the deposition of carbon on the anode to be reduced, the heat-up phase is divided into a first heat-up phase and a second heat-up phase. The reformer is operated in the high-temperature combustion operation in the first heat-up phase, and a superstoichiometric fuel/air mixture is combusted in this operating state in the mixing chamber of the reformer by means of a high-temperature oxidation or combustion. The heat of combustion of the fuel/air mixture which is released in this process is used to heat up the reformer catalyst as well as the anode space of the fuel cell or anode of the fuel cell.

If a predetermined temperature of the reformer catalyst is now reached, which corresponds to the combustion operating temperature or is slightly above this combustion operating temperature, the high-temperature oxidation or combustion of the superstoichiometric fuel/air mixture within the mixing chamber is stopped. The stopping of the combustion or high-temperature oxidation of the superstoichiometric fuel/air mixture represents the end of the first heat-up phase.

After cooling the mixing chamber to a temperature that is below the ignition point of the particular fuel/air mixture used, the second heat-up phase with the formation of a superstoichiometric fuel/air mixture in the mixing chamber begins. It is essential for the second heat-up phase that the reformer catalyst has a temperature that is above the combustion operating temperature. The reformer catalyst is thus operated in the second heat-up phase in a catalytic combustion operation, and the superstoichiometric fuel/air mixture formed in the mixing chamber is combusted catalytically in the catalytic combustion operation. As a result, the cooling time of the mixing chamber can be reduced, on the one hand, and, on the other hand, the entire heat-up phase can be shortened as a whole, because both the reformer catalyst and the anode of the fuel cells can be heated further by the catalytic combustion of the superstoichiometric fuel/air mixture in the second heat-up phase. It shall be ensured in this connection that the reformer catalyst is not overheated and the temperature of the reformer catalyst does not rise above the predetermined maximum temperature during the second heat-up phase.

Furthermore, especially the anode of the fuel cell is heated in the second heat-up phase until it reaches a predetermined temperature, which is below the reox temperature of the anode. If this predetermined temperature of the anode of the fuel cell is reached, the stoichiometry of the fuel/air mixture is changed by varying the air supply or by varying the air supply and the fuel supply, so that the superstoichiometric fuel/air mixture is changed over into a substoichiometric fuel/air mixture. It shall, furthermore, also be ensured now that the temperature of the reformer catalyst does not exceed the maximum allowable temperature. The combustion performance of the reformer catalyst is controlled for this purpose such that the heat of combustion generated during the catalytic combustion of the fuel/air mixture does not lead to overheating of the reformer catalyst and hence to a temperature above the maximum temperature of the reformer catalyst.

If the change in stoichiometry has taken place, the reformer is in the reforming operation, because a substoichiometric fuel/air mixture is converted by the reformer catalyst into synthesis gas, while a superstoichiometric fuel/air mixture is catalytically combusted by the reformer catalyst. To optimize the yield of synthesis gas, the substoichiometric fuel/air mixture is to be set correspondingly in terms of its air ratio $\lambda$. The end of the second heat-up phase is reached with completion of the change in stoichiometry.

It shall be ensured during the change in stoichiometry and especially in case of a stoichiometric fuel/air mixture that the absolute quantity of fuel of the fuel/air mixture is adapted such that the temperature should never rise above the maximum temperature of the reformer catalyst because of the catalytic combustion of the fuel/air mixture. The fuel supply can be reduced for this purpose such that precisely such an overheating can be prevented from occurring.

A second heat-up phase is avoided as a consequence of the change in stoichiometry and heating of the fuel cell system as whole is thus possible more rapidly.

In a further embodiment, the change in stoichiometry is followed by a third heat-up phase. The reformer is operated during this third heat-up phase in a catalytic combustion operation by the catalytic combustion of a substoichiometric fuel/air mixture set within a predetermined range of the $\lambda$ values in the reformer catalyst. This third heat-up phase with a substoichiometric fuel/air mixture is advantageously carried out when the anode of the fuel cell continues to have to be heated and is still below a temperature beginning from which deposition of carbon does not take place any longer. It is not yet possible to change over to the reforming operation in this case, among other things, because of the risk of carbon deposition on the anode. Furthermore, there is a risk of reoxidation of the anode at a correspondingly high oxygen excess during this third heat-up phase. However, it is possible to operate the reformer with a substoichiometric fuel/air mixture close to $\lambda=1$, and incomplete combustion of the fuel takes place in such a just substoichiometric combustion operation, so that the residual fuel can be combusted in the burner arranged downstream of the fuel cell. Deposition of carbon is at least greatly reduced because of the high oxygen content during the third heat-up phase and the risk of reoxidation of the anode is reduced just as greatly because of the just substoichiometric fuel/air mixture and the oxygen deficit associated therewith.

The stoichiometry of the fuel/air mixture is to be set now such that deposition of carbon on the anode is prevented from occurring. The substoichiometric fuel/air mixture is preferably set now at a λ value taken from a λ range of 0.9 to 1.

The range of λ values is from 0.95 to 1 in a preferred embodiment.

A range of λ values from 0.98 to 1 is also advantageous for the third heat-up phase.

It is evident that the above-mentioned features, which will also be explained below, can be used not only in the particular combination described, but in other combinations or alone as well, without going beyond the scope of the present invention.

Preferred exemplary embodiments of the present invention are shown in the drawings and will be explained in more detail in the following description, where identical reference numbers refer to identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
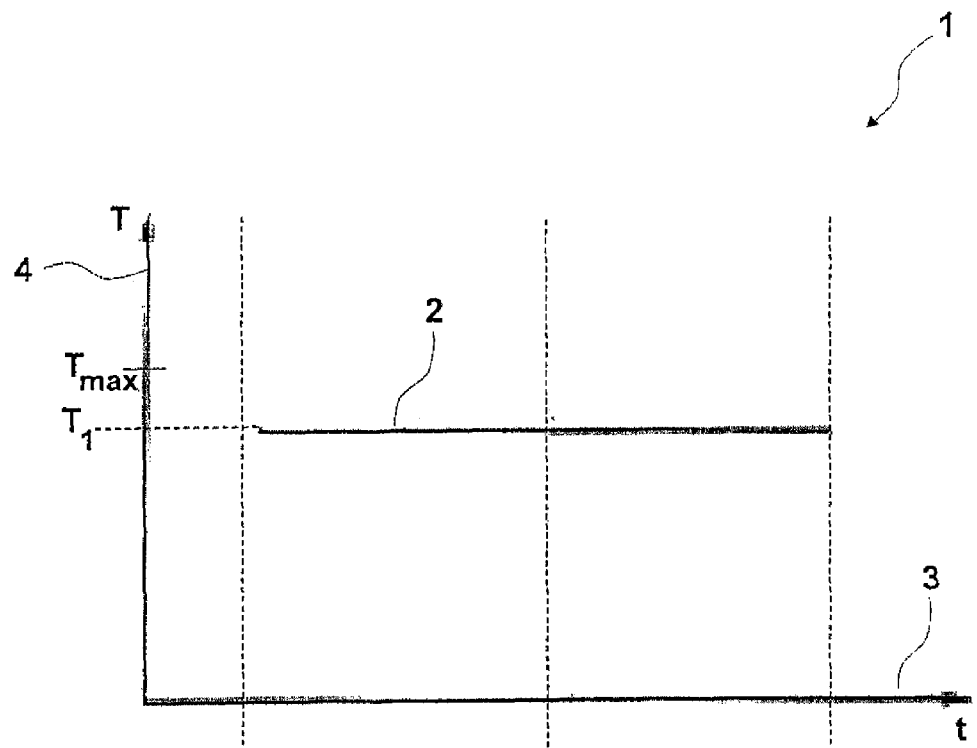
FIG. 1 is a diagram of a temperature curve of a reformer catalyst.

Referring to the drawings in particular, a temperature curve 2 of a reformer catalyst is shown in a temperature-vs.-time diagram 1 in FIG. 1. The time is plotted for this purpose on an X axis 3, while the temperature T is plotted on a Y axis 4. As can be determined from the temperature-vs.-time diagram 1, the temperature curve 2 of the reformer catalyst remains nearly constant at a temperature $T_1$, which remains below a maximum temperature $T_{max}$, because the reformer catalyst may be lastingly damaged beginning from maximum temperature $T_{max}$. The change in stoichiometry begins now, beginning from a time t=0 and ends at a time $t_1$, when a substoichiometric fuel/air mixture is reached, so that synthesis gas can be generated from the substoichiometric fuel/air mixture by the reformer in a reforming operation.

Figure 2:
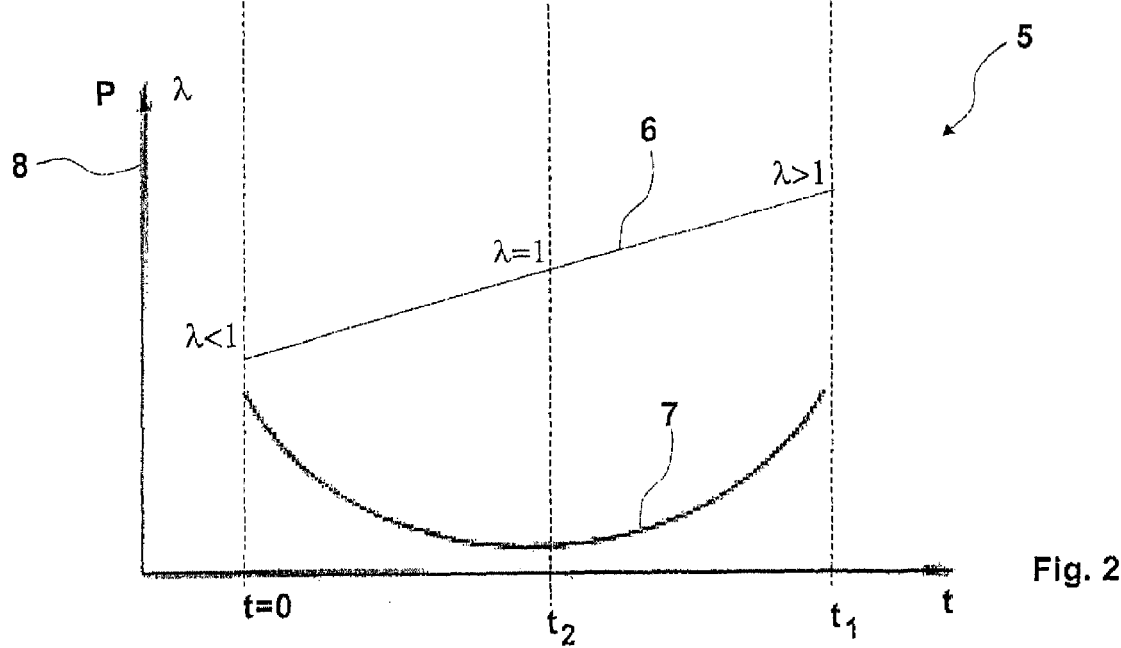
FIG. 2 is a diagram of the fuel performance of a reformer as a function of an air ratio λ of a fuel/air mixture fed to the reformer.

FIG. 2 shows an air ratio curve 6 and a fuel performance curve 7 of the reformer in an air ratio-vs.-fuel performance-vs.-time diagram 5, where the air ratio λ for the air ratio curve 6 and the fuel performance P of the fuel performance curve 7 are plotted on the Y axis 8 of the air ratio-vs.-fuel performance-vs.-time diagram 5. As is apparent from FIG. 2, the air ratio λ of the air ratio curve 6 decreases during the change in stoichiometry, which occurs between t=0 and $t_1$, so that there is changeover from an initial superstoichiometric fuel/air mixture at time t=0 to a substoichiometric fuel/air mixture at time $t_1$ during the change in stoichiometry. A stoichiometric fuel/air mixture with an air ratio of λ=1 is reached at a time $t_2$.

Furthermore, it can be determined from the fuel performance curve 7 that the fuel performance is higher at time t=0 than at time $t_2$, at which a stoichiometric fuel/air mixture is present. The fuel performance of the reformer increases again after time $t_2$ up to time $t_1$. It is guaranteed by this shape of the fuel performance curve 7 that the temperature curve 2 shown in FIG. 1 remains under the maximum temperature $T_{max}$ of the reformer catalyst. It can be determined from FIG. 2 that the lowest combustion performance of the reformer is to be set preferably at time $t_2$ or at a stoichiometric fuel/air mixture, because the risk of overheating of the reformer catalyst is greatest precisely at a stoichiometric fuel/air mixture.

The fuel performance of the reformer is defined here as the quantity of fuel per unit of time.

A change in stoichiometry can be achieved by the supply of air, on the one hand, or fuel supply, on the other hand, being throttled during the change in stoichiometry until a stoichiometric fuel/air mixture is reached and the fuel supply or fuel supply and air supply being increased until a substoichiometric fuel/air mixture is reached, so that the reforming operation can generate synthesis gas for the anode of the fuel cell optimally by means of the reformer catalyst.

Figure 3:
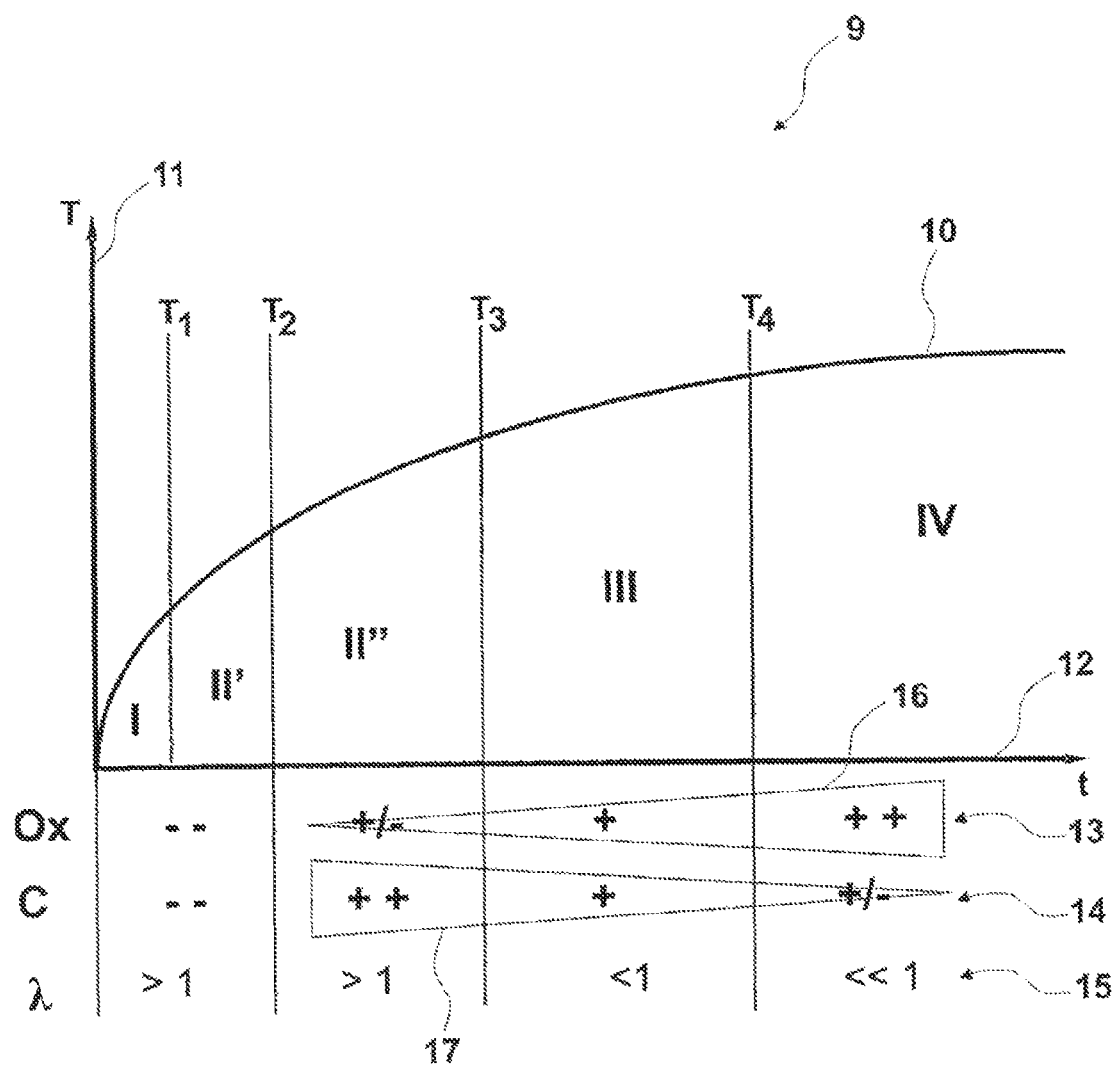
FIG. 3 is a diagram of the curve of the anode temperature during the entire heat-up phase.

The anode temperature is shown in the T,t diagram 9 shown in FIG. 3 by means of an anode temperature curve 10 during the heat-up process I, II', II", III and the subsequent reforming operation IV. The temperature is plotted on the Y axis 11 and the time on the X axis 12. The high-temperature combustion operation takes place in the reformer during the first heat-up phase, characterized by range I. This high-temperature combustion operation is stopped beginning from a temperature $T_1$, the mixing chamber is optionally cooled briefly and changed over into the catalytic combustion operation. The second heat-up phase is thus designated by the ranges II', II". Temperature $T_1$ is preferably in a temperature range of 100° C. to 350° C., especially preferably 150° C. to 350° C. and even more preferably 250° C. to 300° C.

Three rows 13, 14, 15 are arranged below the X axis 12 in FIG. 3. The reoxidation readiness ReOx of the anode is indicated for the respective ranges I/II', II", III and IV in the first row 13, the tendency towards carbon deposition C on the anode is indicated in the second row 14 and the air ratio λ of the fuel/air mixture is indicated in the third row 15. To further illustrate the course of the reoxidation readiness ReOx, a wedge 16 is shown in the first row 13, and a wedge 17 is shown in the second row 14 to illustrate the course of the tendency towards carbon deposition C. Consequently there is no tendency towards carbon deposition C and also no risk of reoxidation in the ranges I/II' at an air ratio λ>1 and consequently air excess. Illustrated by wedge 16, the reoxidation readiness ReOx of the anode increases from range II" to range IV and, illustrated by wedge 17, the tendency towards carbon deposition C decreases.

Thus, there is a slight but nevertheless existing reoxidation readiness ReOx beginning from a temperature $T_2$ in range II" of the second heat-up phase. Furthermore, the tendency towards carbon deposition C is very intense in this range II", so that a great oxygen deficit leads to deposition of carbon. Consequently, the air ratio should/can be λ>1 in this range II". The temperature $T_2$ is preferably in a temperature range of 280° C. to 370° C. especially preferably in a temperature range of 300° C. to 350° C. and even more preferably in a temperature range of 300° C. to 340° C.

The reoxidation readiness ReOx may become critical beginning from a temperature $T_3$ and the oxygen excess must be changed over into an oxygen deficit. The change in stoichiometry is consequently carried out at the beginning of range III. The risk of reoxidation and carbon deposition is still present in this range III, and a substoichiometric fuel/air mixture is therefore fed in order to reduce the reoxidation at least markedly but with a sufficiently high percentage of oxygen in order to likewise reduce the carbon deposition at least markedly. Consequently, at least the air ratio of $0.9 > \lambda > 1$ is to be selected. Temperature $T_3$ is preferably in a temperature range of 350° C. to 550° C., especially preferably in a temperature range of 350° C. to 500° C. and even more preferably in a temperature range of 400° C. to 500° C.

Beginning from a temperature $T_4$, the tendency towards carbon deposition C is reduced to such an extent that the air deficit can be further increased and the operation can be changed over into the reforming operation, which is characterized by range IV. Air ratios of $\lambda = 0.5 +/- 0.2$ are set. Temperature $T_4$ is preferably in a temperature range of 450° C. to 700° C., especially preferably in a temperature range of 450° C. to 650° C. and even more preferably in a temperature range of 500° C. to 650° C.

$T_1 < T_2 < T_3 < T_4$ should be observed when selecting the temperatures.

While specific embodiments of the invention have been shown and described in detail to illustrate the application of the principles of the invention, it will be understood that the invention may be embodied otherwise without departing from such principles.

What is claimed is:

1. A process for starting a fuel cell system, the process comprising the steps of:
    providing a reformer comprising a reformer mixing chamber and a reformer catalyst for generating hydrogen-containing synthesis gas;
    providing at least one fuel cell arranged downstream of the reformer and in fluid connection with the reformer for receiving gas exiting the reformer;
    bringing the reformer catalyst to a predetermined operating temperature during a first fuel cell heat-up phase in a high-temperature combustion operation by means of combustion of a fuel/air mixture in the reformer mixing chamber of the reformer with the gas exiting the reformer from the high-temperature combustion operation being used to heat up the at least one fuel cell;
    stopping the high-temperature combustion of the fuel/air mixture in the reformer mixing chamber at the end of the first heat-up phase;
    operating the reformer at a beginning of a second fuel cell heat-up phase in a catalytic combustion operation by the catalytic combustion of a superstoichiometric fuel/air mixture in the reformer catalyst with the gas exiting the reformer from the catalytic combustion operation being used to heat up the at least one fuel cell; and
    changing over operation of the reformer from fuel cell heat up, provided by the first heat up phase and the second heat up phase, to reforming operation with a substoichiometric fuel/air mixture converted by the reformer to synthesis gas for an anode of the fuel cell.

2. A process in accordance with claim 1, wherein the combustion of the fuel/air mixture is stopped by interrupting the fuel and/or air supply at the end of the first at least one fuel cell heat-up phase.

3. A process in accordance with claim 1, wherein the second fuel cell heat-up phase is started when the reformer mixing chamber has a temperature level below the ignition point of the fuel/air mixture.

4. A process in accordance with claim 1, wherein the second fuel cell heat-up phase is started when the reformer mixing chamber has a temperature level of a cold flame reaction.

5. A process in accordance with claim 4, wherein fuel and air are fed to the reformer mixing chamber, at least at the beginning of the second fuel cell heat-up phase, while forming a superstoichiometric fuel/air mixture, such that the fuel/air mixture is combusted in the reformer mixing chamber by a cold flame reaction.

6. A process in accordance with claim 1, wherein the combustion performance of the reformer is reduced, during the second fuel cell heat-up phase, beginning from the time at which a predetermined limit temperature of an anode area of the at least one fuel cell is reached.

7. A process in accordance with claim 1, wherein the air supply or air supply and fuel supply is/are reduced, during the second fuel cell heat-up phase, beginning from the time at which a predetermined limit temperature of an anode area is reached.

8. A process in accordance with claim 1, wherein a change in the stoichiometry of the fuel/air mixture to a substoichiometric fuel/air mixture is performed, during the second fuel cell heat-up phase, beginning from the time at which a predetermined limit temperature of an anode area is reached.

9. A process in accordance with claim 1, wherein the reformer is operated, during a third fuel cell heat-up phase, of fuel cell heat up, in a catalytic combustion operation by catalytic combustion of a substoichiometric fuel/air mixture in the reformer catalyst, the substoichiometric fuel/air mixture being set within a predetermined range of $\lambda$ values with the catalytic combustion of a substoichiometric fuel/air mixture being used to heat up the at least one fuel cell.

10. A process in accordance with claim 9, wherein beginning from a time at which a predetermined $\lambda$ value of the substoichiometric fuel/air mixture is reached during the third fuel cell heat-up phase, the fuel supply is increased, and the air supply may also be increased at the same time.

11. A fuel system process comprising the steps of:
    providing a fuel system including a reformer with a reformer mixing chamber and a reformer catalyst, for generating hydrogen-containing synthesis gas, and at least one fuel cell arranged downstream of the reformer, the fuel cell having an anode or anode space;
    combusting a fuel/air mixture in a high-temperature combustion operation in the mixing chamber of the reformer to bring the reformer catalyst to a predetermined operating temperature during a first fuel cell heat-up phase of fuel cell heat up, with the gas exiting the reformer from the high-temperature combustion operation being used to heat up the anode or anode space of the fuel cell;
    stopping the high-temperature combustion of the fuel/air mixture in the mixing chamber at the end of the first heat-up phase to cool a mixing temperature within the reformer mixing chamber to below an ignition point of a particular fuel/air mixture used;
    operating the reformer at a beginning of a second fuel cell heat-up phase in a catalytic combustion operation, by the catalytic combustion of a superstoichiometric fuel/air mixture, using the reformer catalyst, at a catalyst combustion operating temperature, with the gas exiting the reformer from the catalytic combustion operation being used to heat up the anode or anode space of the fuel cell; and
    changing over operation of the reformer from the fuel cell heat up, provided by the first heat up phase and the second heat up phase, to a reforming operation comprising converting a substoichiometric fuel/air mixture, by the reformer, to synthesis gas for the anode of the fuel cell.

12. A process in accordance with claim 11, wherein the combustion of the fuel/air mixture is stopped by interrupting the fuel and/or air supply at the end of the first fuel cell heat-up phase.

13. A process in accordance with claim 11, wherein the second fuel cell heat-up phase is started when the mixing chamber has a temperature level below the ignition point of the fuel/air mixture.

14. A process in accordance with claim 11, wherein the second fuel cell heat-up phase is started when the mixing chamber has a temperature level of a cold flame reaction.

15. A process in accordance with claim 14, wherein said step of operating the reformer at a beginning of a second fuel cell heat-up phase in a catalytic combustion operation by the catalytic combustion of a superstoichiometric fuel/air mixture using the reformer catalyst includes feeding fuel and air to the mixing chamber at least at the beginning of the second fuel cell heat-up phase to form a superstoichiometric fuel/air mixture such that the fuel/air mixture is combusted in the mixing chamber by a cold flame reaction.

16. A process in accordance with claim 11, wherein the combustion performance of the reformer is reduced during the second fuel cell heat-up phase beginning from the time at which a predetermined limit temperature of an anode area of the at least one fuel cell is reached.

17. A process in accordance with claim 11, wherein the air supply or air supply and fuel supply is/are reduced during the second fuel cell heat-up phase beginning from the time at which a predetermined limit temperature of an anode area is reached.

18. A process in accordance with claim 11, wherein a change in the stoichiometry of the fuel/air mixture to a substoichiometric fuel/air mixture is performed during the second fuel cell heat-up phase beginning from the time at which a predetermined limit temperature of the anode area is reached.

19. A process in accordance with claim 11, wherein the reformer is operated during a third fuel cell heat-up phase, of fuel cell heat up, in a catalytic combustion operation by catalytic combustion of a substoichiometric fuel/air mixture set within a predetermined range of $\lambda$ values in the reformer catalyst.

20. A process in accordance with claim 19, wherein beginning from the time at which a predetermined $\lambda$ value of the substoichiometric fuel/air mixture is reached during the third fuel cell heat-up phase, the fuel supply is increased, and the air supply may also be increased at the same time.

* * * * *